United States Patent
Promoli

(10) Patent No.: US 6,266,573 B1
(45) Date of Patent: Jul. 24, 2001

(54) PROCESS AND DEVICE FOR THE CONTROL OF DRAFT IN A DRAFTING SYSTEM FOR TEXTILE FIBER MATERIAL

(75) Inventor: Johann-Christian Promoli, Ingolstadt (DE)

(73) Assignee: Rieter Ingolstadt Spinnereimaschinenbau AG, Ingolstadt (DE)

(*) Notice: Subject to any disclaimer, the term of this patent is extended or adjusted under 35 U.S.C. 154(b) by 0 days.

(21) Appl. No.: 09/257,138

(22) Filed: Feb. 19, 1999

(30) Foreign Application Priority Data

Feb. 21, 1998 (DE) .............................................. 198 07 496

(51) Int. Cl.⁷ .............................. D01H 5/38; D01H 5/42; G06F 19/00
(52) U.S. Cl. .............................. 700/142; 700/143; 19/239
(58) Field of Search .................................... 700/142, 143, 700/130; 19/239, 240, 236, 237, 260

(56) References Cited

U.S. PATENT DOCUMENTS

| 4,653,153 | 3/1987 | Felix et al. . |
| 4,812,993 | 3/1989 | Konig et al. . |
| 4,819,301 | 4/1989 | Konig et al. . |
| 5,384,934 | * 1/1995 | Dammig .................................. 19/239 |
| 5,463,556 | 10/1995 | Denz . |
| 5,583,781 | 12/1996 | Denz et al. . |
| 5,713,106 | 2/1998 | Dammig . |
| 5,796,635 | 8/1998 | Dammig . |
| 5,839,166 | 11/1998 | Graute . |
| 6,058,570 | * 5/2000 | Baechler .................................. 19/239 |
| 6,088,882 | * 7/2000 | Leifeld .................................... 19/239 |

FOREIGN PATENT DOCUMENTS

0617149 B1    9/1994  (EP) .

OTHER PUBLICATIONS

German Patent Office Search Report, Dec. 21, 1998.
Article By Handel, Textilindustrie 71, Apr. 1969.

* cited by examiner

*Primary Examiner*—Peter Nerbun
(74) *Attorney, Agent, or Firm*—Dority & Manning

(57) ABSTRACT

The present invention relates to a process and to a device for the control of draft in a drafting system for textile fiber material, whereby a measuring element (MS) which measures the moving fiber material (FM) before its entry into the drafting system (S) transmits measured values ($M_1 \ldots M_n$) to a draft regulating system (VR) and whereby the fiber material (FM) is drafted by means of the operating elements of the drafting system after passage of a delay time which is a function of the deviation of the measured values ($M_1 \ldots M_n$) from a target value (SW). It is the object of the invention to substantially eliminate fluctuations of the thickness of the fiber material through compensation in a drafting system with draft regulation. This object is attained in that the measured values ($M_1 \ldots M_n$) are transmitted to a correction device (SE) and in that an evolution of the draft (K2) and/or a regulating error value (K3) are derived in the correction device (SE) from the measured values ($M_1 \ldots M_n$) and/or their deviations from the target value (SW) and/or from the delay time in order to find error correction values (KW) which influence the drafting of the fiber material.

8 Claims, 4 Drawing Sheets

PROCESS AND DEVICE FOR THE CONTROL OF DRAFT IN A DRAFTING SYSTEM FOR TEXTILE FIBER MATERIAL

BACKGROUND OF THE INVENTION

The present invention relates to a process for the control of draft in a drafting system for textile fiber material, whereby a measuring element which measures the moving fiber material delivers measured values to a drafting control system before intake of the fiber material into the drafting equipment, and whereby the drafting of the fiber material is carried out by means of operating elements of the drafting equipment upon passage of a delay that is a function of the deviation of the measured values from a target value, as well as a device to carry out the process.

DE 36 19 248 A1 relates to a process and to a device for the control of draft of a fiber sliver in a textile machine. Before the intake of the fiber sliver into the drafting system, a measuring element is provided to determine the fiber sliver mass (or thickness). The measuring element is connected to a control device which has an electronic memory device, called memory for short. The measured value of a mass fluctuation is buffer-stored by the memory. After passage of a delay which corresponds to the running time of the fiber sliver from the point of measuring to the drafting location in the drafting system, the control device modifies the drafting by the drafting system in accordance with the buffer-stored value to even out the mass fluctuation. This manner of operation is that of an "open control circuit", i.e. this structure and the described manner of operation are known as a control of the draft (also called draft regulation).

The patent DE 36 19 248 A1 has recognized that erratic changes in the mass of the fiber sliver have beer compensated for poorly until now. The solution according to DE 36 19 248 A1 is based on starting a modification of draft for an individual measured value already before the mass fluctuations of the fiber sliver have reached the drafting point in the drafting system by shortening the delay time. The required individual error correction value can be determined as a function of the gradient or the relative magnitude of the mass fluctuation.

The reaction of the motor for drafting control takes place on the basis of a modified delay time of a stored, individual value. A computer scans the stored signal in forward motion (at a predetermined point in time) and, as a function of the found flank gradient and/or amplitude of the signal, causes a shortening of the running time (corresponding to a shortening of the delay time) by an error correction value (DE 36 19 248 A1 column 5, lines 31 to 36). Obviously the following stored signal is scanned only then.

The solution according to DE 36 19 248 A1 made it possible to better follow the pair of drafting rollers as operating elements of a mass fluctuation, when the mass fluctuation has the character of an erratic function (also known in control technology as a unit step). This applies in case that a mass fluctuation goes continuously in one direction. This solution in the state of the art was based on drafting equipment of draw frames with an output speed of the fiber sliver of approximately 600 m/min to 800 m/min.

Fluctuations in fiber slivers have long been a known problem. Here the term "fluctuations" could include a change in fiber sliver mass as well as a change in the thickness of the fiber sliver. For the sake of simplification, this will be referred to hereinafter for short as thickness fluctuations in the fiber material. Thickness fluctuations can occur in the form of sudden increases in mass (thick locations) with immediately following decreases in mass (thin locations), without any breakage of the sliver occurring. Such events of high amplitude and flank change within a narrow time frame requires extremely rapid reaction on the part of the drafting system, especially of the pair of drafting rollers, so that a complete compensation for thickness fluctuations may be achieved. The sudden reversal between braking and acceleration of the motor for drafting regulation which is involved again leads to a new error by draft control because of the inertia of the operating elements (in particular of the pairs of drafting rollers) or, in case of compensation of the thickness fluctuation which could not be eliminated by the state of the art. At the high delivery speeds of 1200 m/min which have been reached since then, a considerable amount of fiber material continues to be drafted poorly as before because of the above-mentioned disadvantage.

OBJECTS AND SUMMARY OF THE INVENTION

It is a principal object of the present invention to eliminate fluctuations of thickness in the fiber material to a great extent in a drafting system with draft regulation. Additional objects and advantages of the invention will be set forth in part in the following description, or may be obvious from the description, or may be learned through practice of the invention.

The objects of the invention are attained by a process for the control of draft in a drafting system for textile fiber material, whereby a measuring element (MS) which measures the conveyed fiber material (FM) supplies measured values ($M_1 \ldots M_n$) before the intake into the drafting system (S) to a draft regulating system (VR) and whereby the draft of the fiber material (FM) takes place by means of the operating elements of the drafting system after passage of a delay time that is a function of the deviation of the measured values ($M_1 \ldots M_n$) from a target value (SW), characterized in that the measured values ($M_1 \ldots M_n$) are transmitted to a correction device (SE) and that an evolution of draft (K2) and/or a regulating error value (K3) are produced in the correction device (SE) from the measured values ($M_1 \ldots M_n$) and/or from their deviations from the target value (SW) and/or the delay time The characteristic features of a device to carry out the process are also within the scope of the patent. Advantageous embodiments of the invention are described herein.

According to the invention, the measured values of the measuring element are transmitted to a correction device in which an evolution of drafting and/or a regulating value are obtained from the measured values and or the deviation from the target value and/or the delay time, so that error correction values can be determined which influence the drafting of the fiber material in the drafting system. Thereby, irregularities in a fiber sliver are determined as a direct function of the measured value in terms of error correction values which take effect immediately on the drafting of the drafting system and on the draft. The error correction values found cause the fiber sliver to be evened out, in particular at locations where fluctuations from the predetermined target value were determined by measuring elements.

It is advantageous if the measured values are appropriately corrected in the drafting regulation and/or in the correction device by means of the error correction values and/or by means of the regulating error value. This correction of the measured value causes the draft of the drafting system to be corrected in accordance with the change in degree of drafting.

In one embodiment of the process, it is advantageous for the error correction values and/or the regulating error value to be determined while taking into consideration the dynamic properties of the operating elements of the drafting system and/or the magnitude of the deviation from the target value and/or of the gradient of the deviation. This leads to further improvement of the draft, because additional important influence parameters are taken into consideration in the correction.

It is advantageous for the correction of the delay time and/or of the degree of draft of the operating elements to use the error correction values and/or the regulating error value. Thereby all parameters determining the draft are taken into consideration in such a manner that if the delay time and/or the degree of draft are changed, the reaction of the drafting system or its control react immediately and more rapidly. Thereby irregularities in the fiber material are regulated out of existence by changing the point of application (delay time, degree of draft) of the drafting system.

In order to optimally compensate for unevenness in fiber material it is necessary to optimize or minimize the regulating error value.

In addition, it is advantageous if the measured values of the correction device are used in parallel for draft regulation. With parallel draft regulation and correction device, both correction devices can function in parallel and independently of each other. Furthermore the parallel processing of data (measured values) ensures efficient and more rapid functioning of the process.

Furthermore, it is an advantage if the draft: regulating system or the correction device dispose of memory devices in which all measured values and other influence magnitudes (target values, target value deviations, etc.) are stored.

In a further development of the process, the correction device and/or the draft regulating system work with a computer, or both devices are controlled by means of a computer. By using computers, optimization of the regulating error is made possible by means of mathematical optimization processes (e.g. linear optimization, error quadrature method, etc.). Due to the high performance capacity of the computers, the occurring regulating errors can be eliminated to a great extent in the compensation of unevenness in the fiber material.

With respect to the device, and in accordance with the invention, the correction device is connected to the measuring element and/or the draft regulating system in order to determine regulating error values and correction values. Thanks to the manner in which the correction device functions in interaction with the existing devices of the drafting system, it is possible for unevenness in the fiber material to influence the draft of the drafting system as a direct function of the measured values in such manner that a correction of the draft can be effected.

In addition, it is an advantage if the correction device is made to work parallel to the draft regulating system. This leads to a parallel and independent operation of the two devices.

To store the measured influence magnitudes and other parameters which are taken into account for the optimization of the draft and compensation of unevenness, the correction device and/or the draft regulating system have memory devices.

Furthermore the correction device and/ or the draft regulating system are designed advantageously with a computer.

Textile fiber material is draft ed in a drafting system. The draft is controlled by a draft regulation. A measuring device is provided before the drafting system and supplies measured values concerning the thickness of the fiber sliver to the draft regulating system. The draft regulating system comprises at least one memory and a control device which controls a regulating drive. The regulating drive comprises the motor and an amplifier and may be in the form of a servo booster.

The measured values transmitted by the measuring element to the memory are preferably transmitted in parallel to a correction device. In the correction device, the evolution of the draft is produced and the appertaining regulating error is found from the buffer-stored measured values and/or the deviations of the measured values from a predetermined or pre-indicated target value and the appertaining delay times. Error correction values are calculated from the found regulating error value.

The error correction values are determined also while taking into consideration the dynamic properties of the regulating drive, the magnitude of the thickness deviation and the gradient of the thickness deviation.

The correction device functions preferably by means of a program. Mathematical processes, e.g. linear optimization, error quadrature method, etc. can contribute by means of this program to the optimization of the found regulating error value.

The additional error correction values determined by the correction device can be used to correct stored values in the memory of the draft regulating system. The memory stores, e.g., the measured values concerning the thickness of the fiber sliver and the appertaining delay time and other magnitudes or values. The error correction, values can be entered into the correction device in such a manner that the measured values concerning thickness and/or corresponding values of the delay time and/or the degree of draft can be corrected. The memory functions on the organizational principle of FIFO, so that the stored values are transmitted to the control device of the draft regulating system after passage of their delay time, and the resulting regulating error from drafting control will be reduced to a minimum. The configuration of the device is such, in one of its embodiments, that a correction device is provided parallel to it. The input of the correction device is connected to the circuit path which supplies measured values from the measuring elements. The output of the correction device is connected to the memory of the draft regulating system.

The correction device makes it possible to evaluate the reaction of the regulating drive in anticipation, even before releasing the measured values going to the control device. Regulating errors can preferably be recognized and be corrected in advance, before the control device triggers a reaction on the regulating drive. As a result, the resulting or actual regulating error can be minimized. It becomes possible, in particular, to compensate with a minimum of regulating error for thickness fluctuations in form of sudden changes with immediately opposite direction of change An example of an embodiment of the invention is shown in the drawing and described in further detail below:

DETAILED DESCRIPTION

Figure 1:
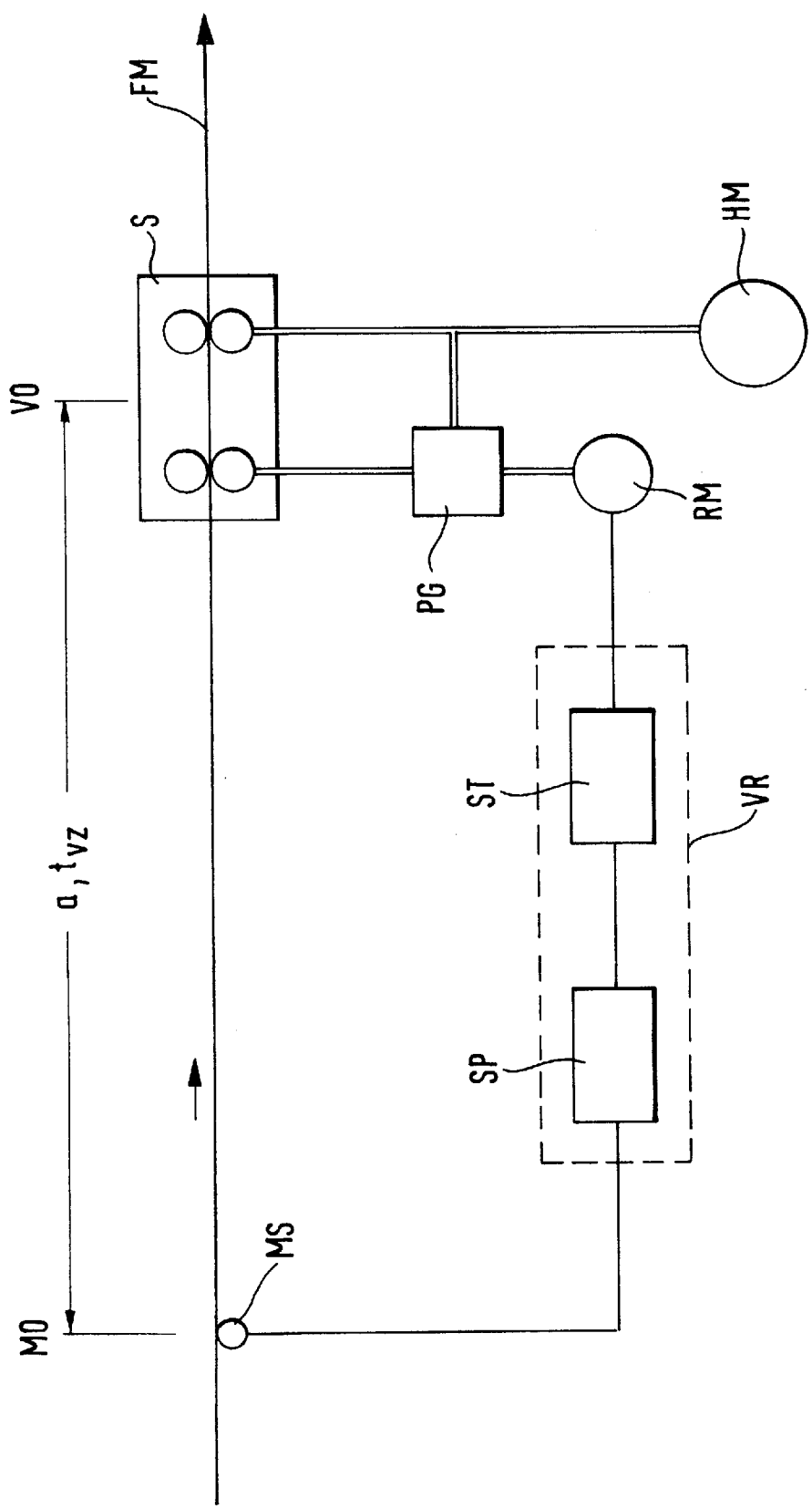
FIG. 1 shows the control of the draft according to the state of the art.

Reference will now be made in detail to the presently preferred embodiments of the invention, one or more examples of which are illustrated in the drawings. Each example is provided by way of explanation of the invention, and not meant as a limitation of the invention. For example, features illustrated or described as part of one embodiment can be used on another embodiment to yield a still further embodiment. It is intended that the present application include such modifications and variations.

FIG. 1 shows a known control system for the drafting of textile fiber material in a drafting system. The control of drafting in a drafting system for textile fiber material (i.e. fiber fleece or fiber sliver) is also known under the term "draft regulation", whereby the control is commonly also referred to as an "open regulating circuit". The term "draft regulation" is used below. Draft regulation is provided with a measuring element MS before the inlet of the fiber material FM in to the drafting system S. The measuring element MS determines the mass or thickness of the fiber material FM entering the drafting system S. For the sake of simplification only the thickness or sliver thickness is discussed below, although the mass can also be determined. The invention is not limited thereby. At times deemed appropriate, measurements of the sliver thickness are taken. Times deemed appropriate could be the multiple of a basic time rhythm or a time during which a constant length of fiber material has passed after the previous measurement. The direction of movement of the fiber material FM is shown in FIG. 1 by means of an arrow. The main motor HM ensures a constant delivery speed of the fiber material FM. The fiber material FM is drafted in the drafting system S, whereby the draft can be modified to compensate for thickness fluctuations. This is achieved by means of a change in rotational speed of the pair of rollers (or several such pairs) in the inlet of the drafting system.

A delay time $t_{vz}$ exists between the measuring point MO of the fiber material and the drafting point VO. The delay time $t_{vz}$ takes that time into consideration which is needed by the measured fiber material to go from the measuring point MO to the drafting point VO in the drafting system S. This delay of a measured value takes place in a memory SP of the draft regulating system VR. The memory SP contains as stored value the measured values pertaining to sliver thickness and values of a delay time. In this case each measured value has an associated delay time. The memory SP operates on the well-known organizational principle FIFO (first in, first out). This FIFO principle of memory organization is already known from the drafting systems with draft regulation now on the market. The found measured values are delayed in time in the memory SP until the measured point of the fiber material has covered the distance "a" from the measuring point MO to the drafting point VO. Upon passage of the delay time $t_{vz}$ the measured value is released to the control device ST and, if a thickness fluctuation exists, provokes a modification of the draft and indirectly a correction of the thickness fluctuation by means of a corresponding change in rotational speed of the regulating drive RM with planetary gear PG. The term regulating drive RM designates the motor and its amplifier, e.g. a servo-motor.

For faultless functioning of the draft regulating system VR, it is important that the measured point of the fiber material is exactly at the drafting point VO at the point in time of release of a measured value. This corresponds to a precise point at which regulation is initiated.

Figure 2:
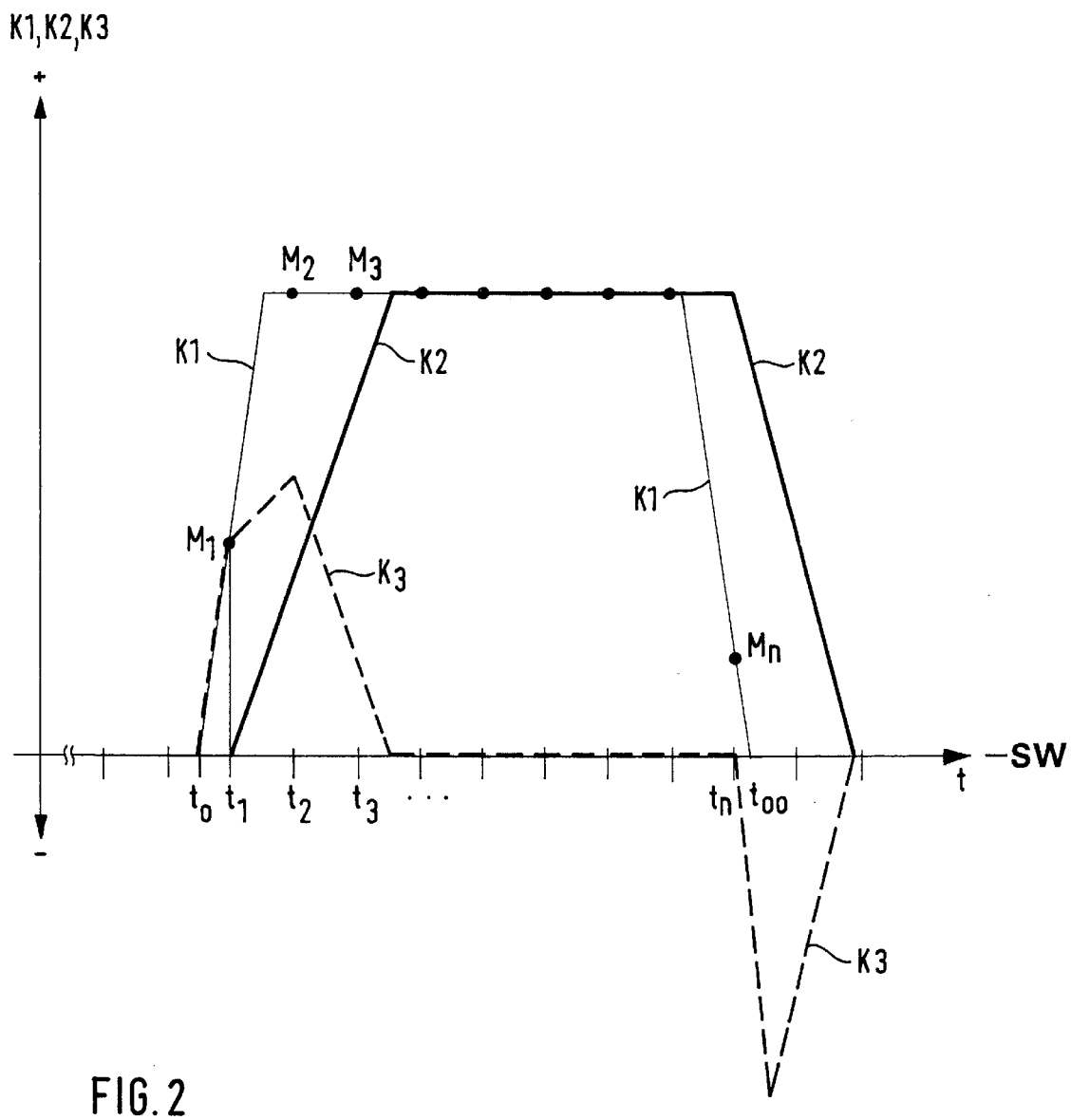
FIG. 2 shows the functional connection between deviation of sliver thickness and reaction behavior of the regulating drive according to the state of the art.

FIG. 2 shows functional connections of a known draft regulating system according to FIG. 1 according to the state of the art. In this case the curve K1 shows the evolution of a sliver thickness measured with the measuring element MS. The sliver thickness is shown over a time t. The target value SW of the sliver thickness is on the time axis (abscissa). The drawing shows a detail. At point in time $t_0$, the sliver thickness increases sharply. The points in time $t_1$, $t_2$, $t_3$ to $t_n$ are shown in which measured values concerning sliver thickness are determined. This represents a digital scanning of the fiber material. The measured values ($M_1$ to $M_n$) thus obtained are reflected again in the curve K1 at the times of scanning. At point in time $t_{oo}$ the sliver thickness has again reached the target value SW. The curve K1 shows the evolution in time of a fluctuation of the fiber material thickness. In order to further clarify that which is essential, an idealized fluctuation is shown. The rapid increase in sliver thickness and its rapid decrease are shown in an idealized manner in order to explain the principle of the process in further detail.

In the ideal case of draft regulation, the regulating motor RM of a servo-drive must follow this curve K1 exactly. The curve K1 thus is a target-value curve of the regulating motor RM.

The actual reaction of the regulating motor by means of a draft regulating system VR according to FIG. 1 is represented by curve K2. The evolution of the curve K2 documents the actual speed ratio of the regulating motor there after passage of the corresponding delay time delay time $t_{vz}$. For the sake of clarity, this delay time is not taken into account for the curve in FIG. 2. The shown speed ratio is representative for the evolution of draft and is thereby representative for the attained correction of the sliver thickness fluctuation.

At point in time $t_1$, the measured value M1 is transferred to the control device ST and the latter recognizes that the sliver thickness is subjected to rapid change relative to the target value SW. At point in time $t_1(+t_{vz})$ the regulating drive RM will start its speed in order to increase the degree of draft. With greater draft, the increase of thickness in the fiber material is counteracted.

As can further be recognized from FIG. 2, the regulating drive RM (curve K2) follows the sliver thickness according to curve K1 with a delay of $t_{vz}+(t_1-t_0)$. The causes are inertia moments in the force transmission of the drive system. Thereby a regulating error is produced. The curve K3 documents the evolution of the regulating error and represents the difference between the two curves K1 and K2. The regulating error exists already at point in time $t_1$ since the regulating motor RM starts a speed acceleration only at this point in time $t_1$. At point in time $t_1$ the regulating error has further increased, because the correction of the sliver thickness is still insufficient.

The evolution of the regulating error K3 represents the result of fiber material draft that could be attained until now (curve K1 "minus" curve K2). The regulating error K3 is relatively great and fluctuates from the positive range (fiber sliver too thick) via a faultless range into a negative range (fiber sliver too thin).

Figure 3:
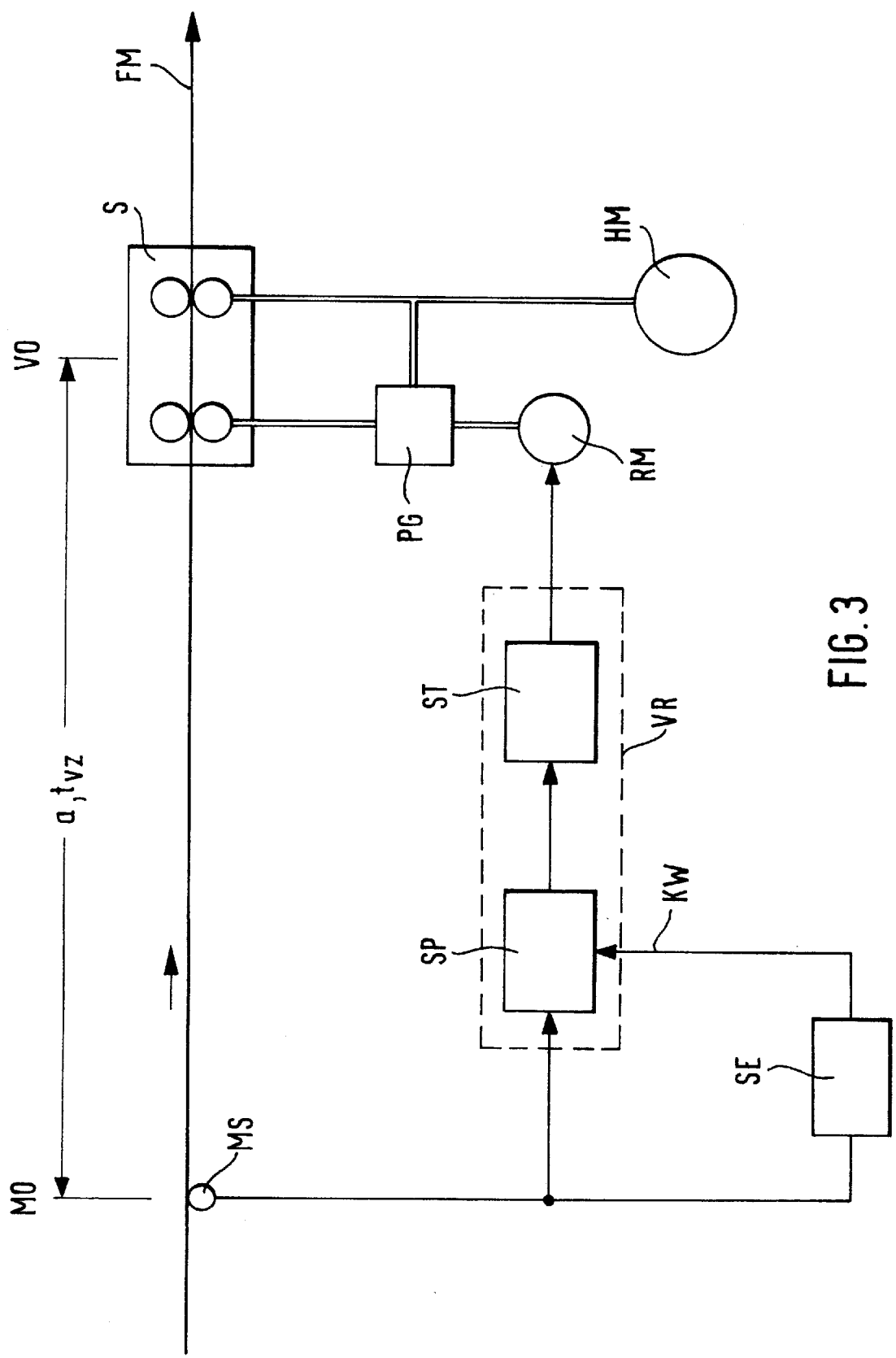
FIG. 3 is a schematic representation of draft controls according to the invention, in a drafting system

FIG. 3 shows the draft regulation according to the invention, whereby a measuring element MS delivers measured values to a memory SP. The memory SP stores measured values, again according to the known organizational principle FIFO (first in first out). The measured values delivered to the memory are transmitted in parallel to a correction device SE.

In the correction device SE the following operational steps are carried out:

A) From all the measured values transmitted to the correction device SE, the evolution, over time, of the sliver thickness (curve K1) are determined for the distance "a" between measuring point MO and drafting point VO. This evolution of the curve K1 is a reflection of the momentary contents of the memory SP in measured values.

B) Taking a predetermined target value SW of sliver thickness as a basis, deviations ($M_1$ to $M_n$) in the fiber material are determined.

C) In the following step an optimized (virtual) draft regulation is determined. A virtual draft regulation means that, instead of the actual draft regulation, a mathematical optimization process of the draft regulation is being used, which simulates in its external behavior the actual draft regulation. The mathematical process applied is realized by means of a computer system. The virtual and the optimized draft regulation are based on the measured values ($M_1$ to $M_n$) and the appertaining delay time.

D) The result of the virtual draft regulation is evaluated and is followed by a determination of the optimized, i.e. minimized regulating error value K30.

E) Using the minimal regulating error value K30, error correction values KW are then found. The error correction values KW are here determined while taking into account the dynamic properties of the regulating motor, the magnitude of the thickness deviation (amplitude) and the gradient of the thickness deviation. The error correction values are used by the correction device SE in order to correct the stored values, i.e. the individual measured values and/or the appertaining delay time and/or the degree of drafting in the memory SP.

The correction device SE makes it possible to evaluate in advance the reaction of the regulating motor RM, even before release of the measured values to the control device ST. Possible regulating errors can be recognized and can be corrected in advance, before the control device ST of the draft regulating system VR triggers a reaction in the regulating motor RM.

Figure 4:
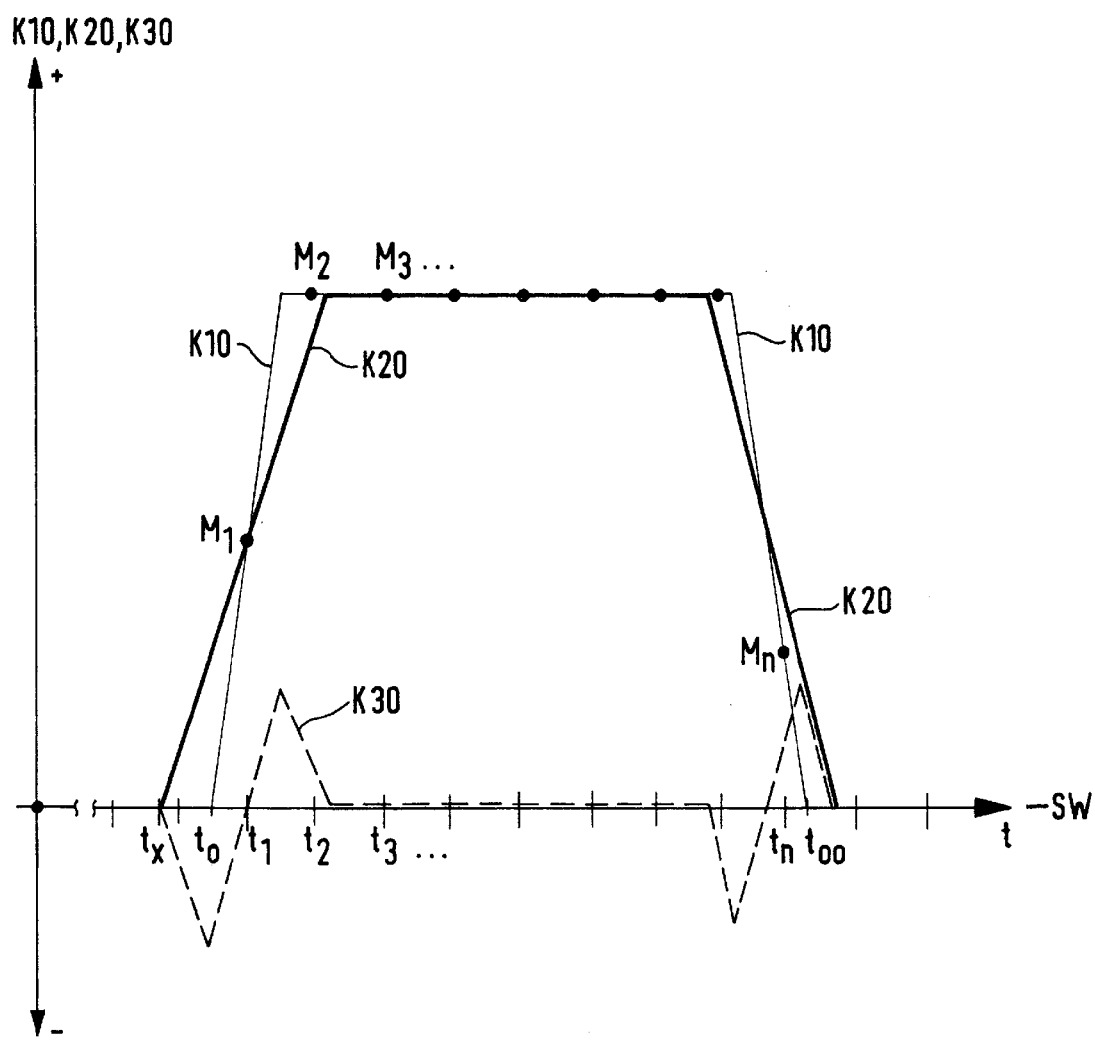
FIG. 4 shows minimization of the regulating error by means of the invention.

FIG. 4 shows functional interrelations between sliver thickness and reaction of the regulating motor, or resulting regulating error according to the invention. FIG. 4 shows the evolution K10 relative to the thickness of the fiber material as being an evolution of the same type as evolution K1 of FIG. 2.

By using the correction device SE, the draft regulation VR was influenced in such a manner that for example the regulating motor RM must now start significantly earlier by point in time $t_{vz}+(t_0-t_x)$ with its modification of speed (for the same gradient of speed change of the RM). The curve K20 (shortened in time by the delay time $t_{vz}$) now follows much more closely the curve K10 than was possible in the state of the art until now for thickness changes of high amplitude and flank change within a narrow time range. Curve K20 reflects the speed behavior of the regulating motor RM as reaction to the thickness deviation K10, in order to achieve a compensation for the thickness deviation. The resulting regulating error with curve K30 (equal to the difference K10 "minus" K20) for this becomes a minimum.

It should be appreciated by those skilled in the art that various modifications and variations can be made in the process and device according to the present invention without departing from the scope and spirit of the invention. It is intended that the invention include such modifications and variations as come within the scope of the claims and their equivalents.

What is claimed is:

1. A process for controlling draft of textile fiber material in a drafting textile machine drafting system, said process comprising the steps of:

measuring a characteristic of the fiber material with a measuring device prior to entry of the fiber material into the drafting system and generating measured values from said measuring step;

correcting the measured values;

drafting the fiber material at the drafting point of the drafting system by controlling drafting elements of the drafting system as a function of the corrected measured values; and wherein said step of correcting the measured values further comprises the control steps of:

transmitting the measured values to a correction device arid with the correction device, generating a mathematical simulation of a draft regulation error curve that compensates for any combination of operating properties of the drafting elements, magnitude of fiber material thickness deviation from a target value, and the gradient of the fiber material thickness deviation;

generating error correction values with the correction device based on deviations between the draft regulation error curve and the measured values; and applying the error correction values to the measured values prior to obtaining the corrected measured values.

2. The process as in claim 1, wherein said measuring a characteristic of the fiber material comprises measuring fiber material thickness.

3. The process as in claim 1, wherein said measuring a characteristic of the fiber material comprises measuring fiber material mass.

4. The process as in claim 1, wherein the correction device utilizes a computer for said generating of the draft regulation error curve and error correction values.

5. The process as in claim 1, wherein said drafting system is controlled by a computer for drafting the fiber material with the corrected measuring values.

6. The process as in claim 1, wherein said measuring a characteristic of the fiber material comprises making the measurement at predetermined time intervals.

7. The process as in claim 1, wherein said measuring a characteristic of the fiber material comprises making the measurement at predetermined lengths of the fiber material.

8. The process as in claim 1, further comprising storing the measured values in a memory storage device for a time period it takes for the fiber material to travel from the measuring device to a drafting point of the drafting system.

* * * * *